United States Patent [19]

Rook et al.

[11] Patent Number: 4,886,633

[45] Date of Patent: Dec. 12, 1989

[54] METHOD FOR MANUFACTURING STONES IN A PRESS

[75] Inventors: Cornelis Rook, AW Krimpen aan den Lek; Willem Klein, ND Laren, both of Netherlands

[73] Assignee: Gebroeders Rock Beheer B.V., Krimpen aan den IJssel, Netherlands

[21] Appl. No.: 284,839

[22] Filed: Dec. 13, 1988

Related U.S. Application Data

[63] Continuation of Ser. No. 901,541, Aug. 25, 1986, abandoned.

[30] Foreign Application Priority Data

Aug. 23, 1985 [NL] Netherlands .......................... 8502316
Sep. 11, 1985 [NL] Netherlands .......................... 8502484

[51] Int. Cl.[4] .......................... B28B 3/02; B28B 7/10; B29C 33/42

[52] U.S. Cl. .................................... 264/219; 249/131; 264/297.9; 264/334; 425/255; 425/354; 425/358

[58] Field of Search ............... 425/253, 254, 255, 452, 425/353, 354, 356, 358, DIG. 106; 249/131, 132; 264/333, 334, 297.8, 40.5, 297.9, 219

[56] References Cited

U.S. PATENT DOCUMENTS

| | | | |
|---|---|---|---|
| 769,771 | 9/1904 | Seamans | 249/131 |
| 833,814 | 10/1906 | White | 249/131 |
| 1,332,457 | 3/1920 | Burkhardt | 264/333 |
| 1,559,498 | 10/1925 | Brandell | 425/452 X |
| 1,807,315 | 5/1931 | Knutson | 425/DIG. 106 |
| 1,846,196 | 2/1932 | Goldsmith | 425/DIG. 106 |
| 1,921,003 | 8/1933 | Romie | 425/424 |
| 2,475,435 | 7/1949 | Rasmussen | 249/148 |
| 2,515,491 | 7/1950 | Briscoe | 425/255 |
| 2,582,161 | 1/1952 | Randall | 264/333 X |
| 2,624,928 | 1/1953 | Long | 425/358 |
| 2,977,657 | 4/1961 | Willemsen | 425/DIG. 106 |
| 2,985,935 | 5/1961 | Wellnitz | 425/452 X |
| 2,996,782 | 8/1961 | Kovach et al. | 425/452 |
| 3,090,093 | 5/1963 | Long | 425/356 |
| 3,109,217 | 11/1963 | Kell | 425/DIG. 106 |
| 3,331,112 | 7/1967 | Clanton et al. | 425/253 X |
| 3,497,580 | 2/1970 | Taylor-Smith | 425/452 X |
| 3,679,340 | 7/1972 | Springs | 425/432 X |
| 3,782,680 | 11/1974 | Hopkins | 425/DIG. 106 |
| 4,427,355 | 1/1984 | Vatterott | 425/167 X |

FOREIGN PATENT DOCUMENTS 1584467 4/1970 Fed. Rep. of Germany .

*Primary Examiner*—Jan H. Silbaugh
*Assistant Examiner*—Karen D. Kutach
*Attorney, Agent, or Firm*—Oblon, Spivak, McClelland, Maier & Neustadt

[57] ABSTRACT

Method for manufacturing stones in a press provided with a mould including several moulding rooms and taking a fixed position, a stamp arranged above the mould and being movable up and down, a table arranged under the mould and being movable up and down, a supply conveyor for supplying empty product plates and with a discharge conveyor for discharging the product plates carrying stones shaped in the mould. The moulding mass is compressed in the mould while under the mould a moulding plate supported by the table is located, which is provided with upright ribs for shaping bevelled edges on the stones. During compression the stamp is moved downward until the stamp is located at a certain distance from the table, determined by cooperating stops provided on the table and on the stamp, after which the moulding plate is removed from between the table and the mould, while simultaneously a product plate is moved between the table and the mould. Next the stones shaped in the mould are pressed out of the mould by moving the stamp and the table simultaneously downward while maintaining the desired distance between the table and the stamp by means of the stops.

17 Claims, 7 Drawing Sheets

1
2
3
4
5
6
7
8
9
10
11

METHOD FOR MANUFACTURING STONES IN A PRESS

This application is a Continuation of application Ser. No. 901,541, filed on August 25, 1986, now abandoned.

FIELD OF THE INVENTION

The invention relates to a method for manufacturing stones in a press provided with a mould comprising several moulding rooms and taking a fixed position, a stamp arranged above the mould and being movable up- and -down, a table arranged under the mould and being movable up- and -down, a supply conveyor for supplying empty product plates, and a discharge conveyor for discharging the product plates carrying stones shaped in the mould.

BACKGROUND OF THE INVENTION

From the U.S. Pat. No. 1,921,003 there is known a press whereby for shaping the stones in the mould a moulding plate having a smooth upper surface is moved under the mould and which is pressed against the bottom of the mould by means of an eccentric mechanism before the mould is set into vibration.

After the mass put into the mould has been compressed sufficiently, the moulding plate is moved from under the mould and a product plate (i.e., a plate on which the shaped products are discharged from the press and are, e.g., conveyed to a drying or storage room) is moved under the mould. At the same time, a spring-suspended table is move upward for supporting the product plate moved under the mould. Following that, the products shaped in the mould are pressed downward out of the mould by means of the stamp, whilst at the same time the spring-suspended table is also moved downward.

When applying such a method of manufacturing products, it is not possible to ensure a constant height of the products shaped in the mould. In particular, on removing the products from the mould there is a danger that the products will be deformed in an undesirable manner between the stamp and the spring-suspended table.

From the U.S. Pat. No. 3,679,340 there is furthermore known a press provided with a vertically adjustable table by means of which a product plate is pressed against the bottom of the mould for shaping products in the mould arranged in a fixed position. Moulding bars may thereby be moved above the product plate into openings provided in the mould for that purpose for forming holes in the products to be shaped.

Also in this case the products are pressed out of the mould by means of stamps after moulding, whilst the table with the moulding plate is thereby moved downward, but also in this case no means have been provided to ensure that the products shaped in the mould keep a constant height.

Paving stones and the like, however, need to have a constant length and width to make possible the pavement of a road surface or the like in a regular pattern, whilst such paving stones usually must be provided with bevelled edges or so-called chamfers. For the thickness dimension the requirements are less strict, as differences in thickness of the paving stones can be absorbed by the sand bed or the like in which the stones are placed. Therefore it has been quite common so far to manufacture such stones lying in a mould, so that the measures of length and width of the stones are determined by the vertical walls bounding the moulding rooms in the mould, so that a constant measure of length and width can be ensured. In particular, with stones having chamfers the stones are thereby shaped in the mould in such a manner that the eventual upper surface of a stone is shaped in the bottom of the mould lying on the moulding plate. Because of this, in practice the upper surface of the stones shaped in such a manner appears to be the least wear-resistant surface of the brick.

OBJECT OF THE INVENTION

The purpose of the invention now is to obtain a method whereby such stones provided with chamfers can be produced vertically standing, as a greater production capacity can be achieved herewith as well as a better compression of the material of which the stone is made. In particular, the upper surfaces of the stones, which are shaped in the mould against the upright side walls of the moulding rooms in the mould, obtain a dense surface thereby, which is more wear-resistant than the upper surfaces of the stones produced in the usual manner.

SUMMARY OF THE INVENTION

According to a first aspect of the invention, this can be achieved because the moulding mass is compressed in the mould whilst under the mould a moulding plate supported by the table is located. The moulding plate is provided with upright ribs for shaping bevelled edges on the stones. During compression, the stamp is moved downward until the stamp is located at a certain distance from the table, determined by cooperating stops provided on the table and on the stamp, after which the moulding plate is removed from between the table and the mould. Simultaneously a product plate is moved between the table and the mould, and next the stones shaped in the mould are pressed out of the mould by moving the stamp and the table simultaneously downward while maintaining the desired distance between the table and the stamp by means of the stops.

According to a second aspect of the invention, the purpose aimed at can be achieved because the moulding mass is compressed, whilst under the mould there is located a moulding plate supported by the table and lying on the product plate. The moulding plate is provided with upright ribs for shaping bevelled edges on the stones. During compression, the stamp is moved downward until the stamp is located at a certain distance from the table, determined by cooperating stops provided on the table and on the stamp, after which the moulding plate is pulled from between the mould and the product plate lying on the table. Then the product plate lying on the table is moved upward over a distance equal to the thickness of the moulding plate between the ribs. After the stones shaped in the mould are pressed out of the mould by moving the stamp and the table simultaneously downward while maintaining the desired distance between the table and the stamp by means of the stops.

The table with the product plate can be moved upward entirely after removal of the moulding plate, whilst end surfaces of the stops provided on the table or the stamp are likewise displaced along a distance equal to the thickness of the moulding plate between the ribs.

Another possibility is to press, after removal of the moulding plate, a part of the table supporting the product plate upward relative to the part of the table carrying the remaining part of the stops until the product plate bears against the bottom of the mould.

When applying the above methods, it is always ensured, therefore, the stones are given a certain length during shaping in the mould determined by the distance at which the stamp and the table are kept from each other by means of the stops. The distance between table and stamp is also maintained during the removal of the stones from the mould.

With the method according to the invention, care is always taken that the product plate bears against the bottoms of the stones shaped in the mould before the stones, retained between the product plate and the stamp held at a fixed distance from the product plate, are pressed out of the mould by means of the stamp.

Thus it is not only prevented that the stones undergo undesired deformations as a result of uncontrolled movements of the product plate and the mould relatively to each other, but is also prevented that the stones fall out of the mould onto a product plate located at some distance under the mould, which might also lead to undesired deformations.

It is noted that, although hereinabove a mould with a fixed arrangement has been discussed, it is of course possible to set the mould vibrating, as is, e.g., described for the mould with fixed arrangement in the U.S. Pat. No. 1,921,003.

It is noted that from the German Offenlegungsschrift 1,584,467 there is known a method for manufacturing stones whereby the stones are shaped on a moulding plate lying between a mould and a product plate on a table during the manufacturing of the stones. After compression of the moulding mass in the mould, the moulding plate is removed, and the mould is moved upward relative to the stamp for pressing the shaped products out of the mould. Also when using such a method, it is not possible to ensure a constant height of the product.

BRIEF DESCRIPTION OF THE DRAWINGS

The invention will be more fully explained hereinafter with reference to some embodiments of the method and a device according to the invention illustrated in the accompanying figures.

DETAILED DESCRIPTION OF THE PRESENTLY PREFERRED EMBODIMENTS

Figures 1, 2, 3, 4, 5:
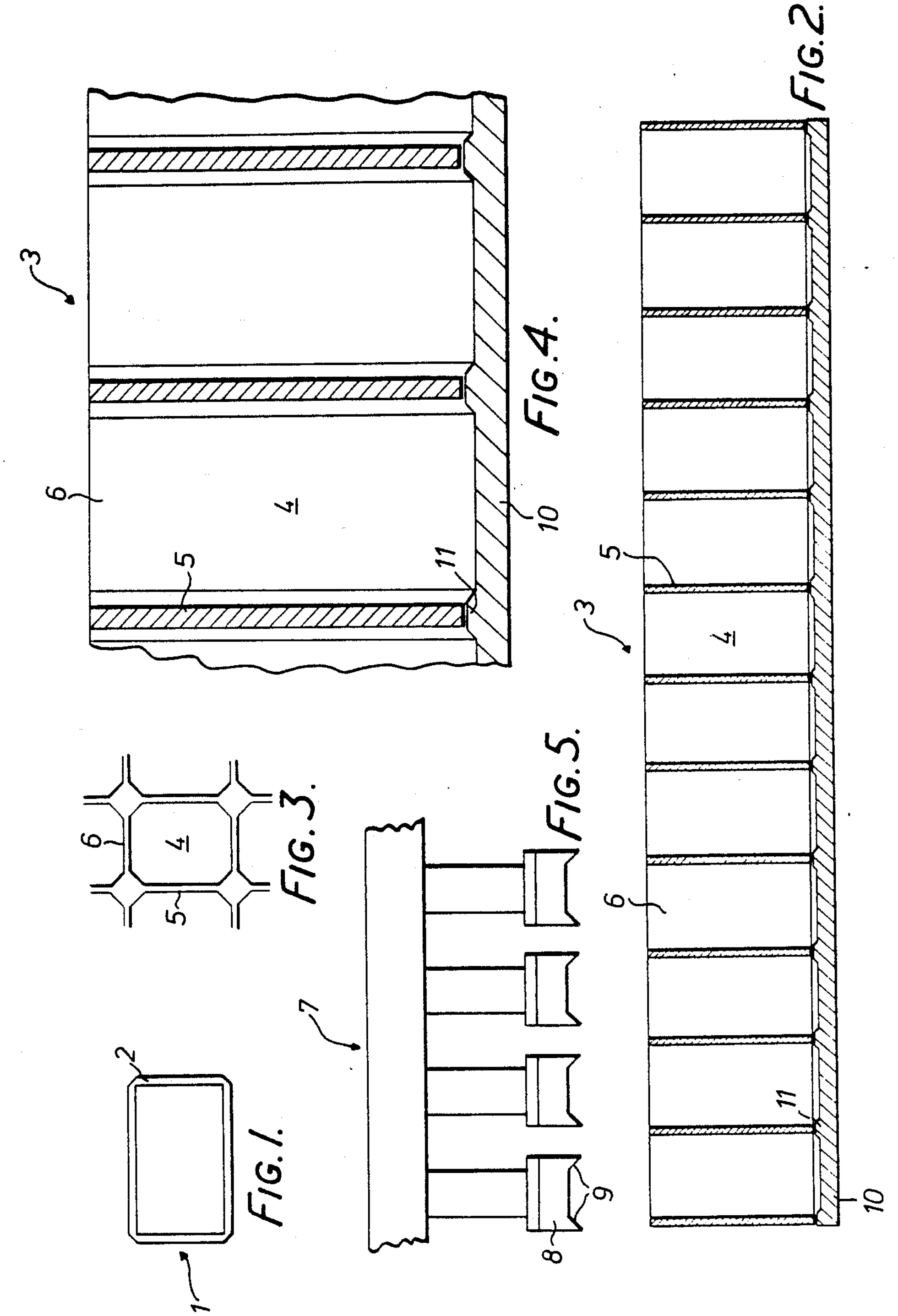
FIG. 1 is a view of a stone to be manufactured while applying the method and/or device according to the invention.
FIG. 2 is a diagrammatic section of a mould with a moulding plate provided with ribs located thereunder.
FIG. 3 is a top view of a part of the mould illustrated in FIG. 2.
FIG. 4 is a larger-scale illustration of a part of FIG. 2.
FIG. 5 illustrates a part of a stamp.

The purpose of the device and method according to the invention is to produce a stone or clinker of the type such as illustrated in FIG. 1 i.e., a preferably elongated stone 1, rectangular in cross-section, which at least at one of its bounding planes is provided with bevelled edges 2.

For shaping such a stone use is made of a mould 3, which is subdivided into moulding rooms 4 by means of longitudinal walls 5 and transverse walls 6, both of which are referred to hereinafter as "dividing walls".

As illustrated in FIG. 3 the moulding rooms 4 are bevelled near the joining points between the longitudinal walls 5 and the transverse walls 6. In the illustrated embodiment, all angles are bevelled so that a stone shaped in such a moulding room 4 will be provided with bevelled edges 2 at two planes lying opposite each other. It will be apparent that it will also be possible, however, to let the walls 5 and 6 join each other rectangularly at one side of the moulding room 4, so that the stone will be provided with bevelled edges at only one side.

The moulding mass to be provided in the moulding rooms 4 can be compressed by means of a stamp 7 illustrated in FIG. 5, which stamp is provided with a number of stamp heads 8. (see FIG. 5). In the illustrated embodiment, each stamp head 8 is provided with a pair of protruding noses 9 for forming bevelled edges 2 at two facing sides of the stone to be formed. It will be apparent, however, that if desired also one of the noses can be left out, so that only at one side of the stone a bevelled edge 2 will be formed by means of a nose 9.

As further appears from FIGS. 2 and 4 the mould 3 may be closed at the bottom during shaping of the stones by means of a so-called moulding plate 10, which is provided with upright ribs 11, which have been provided in such a manner that the upright ribs 11 extend at least substantially under the longitudinal walls 5. As will be particularly apparent from FIG. 4, the ribs 11 protruding outside the longitudinal walls 5 are bounded by sloping boundary planes, so that the parts of the ribs 11 protruding outside the longitudinal walls 5 will form bevelled edges 2 in the stones 1 shaped in the moulding rooms 4.

In the illustrated embodiment, bevelled edges 2 will be formed at facing sides of a stone 1 shaped in the moulding room by the ribs 11. It will be possible, however, to bound a rib 11 at one side by means of a vertical plane located in the extension of one side of the relevant longitudinal wall 5, so that the stones 1 shaped in the moulding rooms 4 of the mould 3 will each be provided at only one side with a bevelled edge 2 by the ribs 11.

Summarizing, it will be apparent, however, that by means of the above mould 3 in co-operation with the stamp 7 and the moulding plate 10 depending on the chosen shape, stones 1 can be shaped which may be provided, either at one side or at two facing sides, with bevelled edges 2 or so-called chamfers. The stones 1 can thereby be produced in the mould 3 with the longitudinal axes arranged vertically on the moulding plate 10, so that, with a surface of the mould 3 remaining equal a considerably larger amount of stones 1 can be produced than in the case when the stones 1 are produced in the mould 3 with their longitudinal axis parallel to the moulding plate 10.

A possible method for manufacturing stones 1 while using parts described hereinabove in a press for manufacturing stones will be more fully described hereinafter with reference to FIGS. 6–11.

The press comprises a frame, not further illustrated, in which the stamp 7 is arranged movable in vertical direction above the mould 3 mounted in the frame. Furthermore the press is provided with a filling wagon 12, that is movable to and fro along rails or the like not further illustrated. Under the mould 3 a table 14, movable up and down by means of adjusting cylinders 13, is arranged. When the table 14 takes its lowest position, illustrated in FIG. 6, the upper surface of the table 14 is located at the same level as the upper surface of a discharge device 15. Arranged at the side of the table 14 turned away from the discharge device 15 is an adjusting cylinder 16 by means of which a pushing means 17 is movable to and fro in the horizontal direction across the table 14 when the table 14 takes the lowest position illustrated in FIG. 6.

Figure 6:
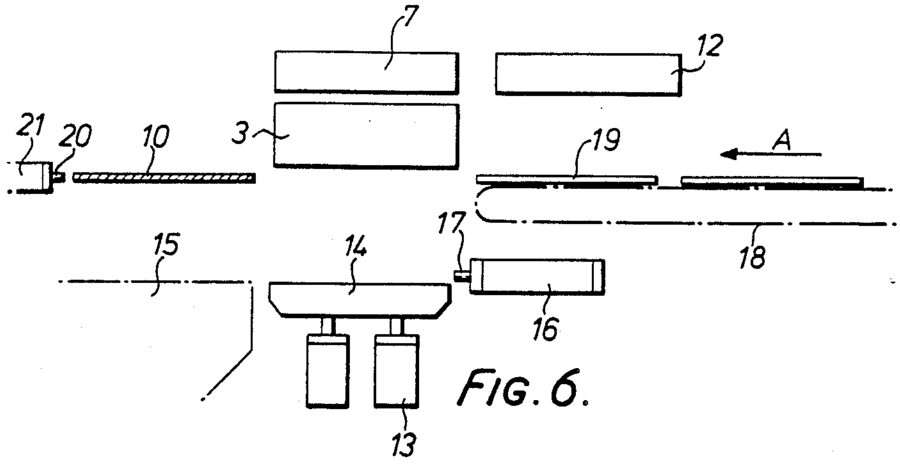
FIGS. 6–11 diagrammatically illustrate an embodiment of a press according to the invention, whereby the various parts of the press are illustrated in positions which they take during consecutive stages of the method according to the invention.

The device is provided with a conveyor 18, diagrammatically illustrated on the right of the mould 3 in FIG. 6, which conveyor is not illustrated in the other FIGS. 7–11. By means of the conveyor 18, so-called product plates 19, preferably being entirely flat at least at their upper side, are supplied in the direction according to arrow A At the side of the mould 3 turned away from the conveyor 18, supporting means, not further illustrated, have been provided across which a moulding plate 10 is displaceable by means of a pushing means 20 displaceable to and fro in the horizontal direction and being adjustable by an adjusting cylinder 21 only partly illustrated.

As will further be apparent from FIG. 6, both the product plates 19 and the moulding plate 10 lie in one plane, in which they are displaceable just under the bottom of the mould 3.

Figure 7:
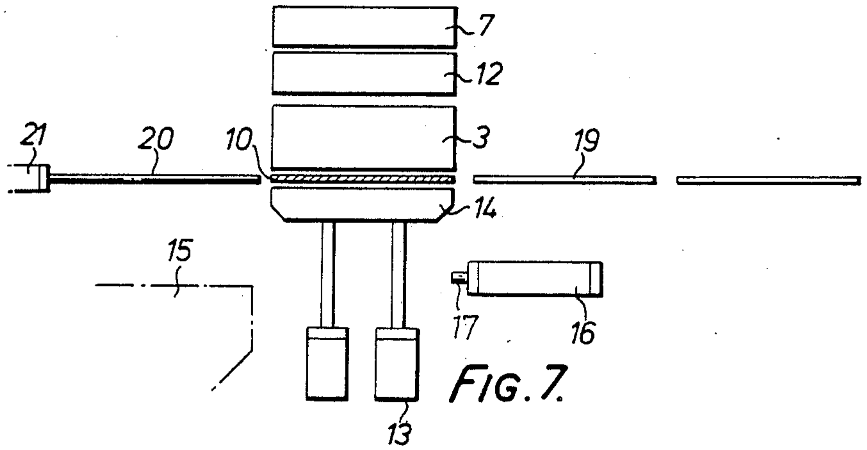

For filling the moulding rooms 4 of the mould 3, the table 14 is pressed upward from the position illustrated in FIG. 6 to the position illustrated in FIG. 7, whilst the moulding plate 10 is moved on the table 14 by the pushing means 20. Simultaneously or afterwards, the stamp 7 is moved upward and the filling wagon 12 is brought above the mould 3, so that the moulding mass in the filling wagon 12 can be deposited from the filling wagon 12 into the moulding rooms 4 of the mould 3.

Figure 8:
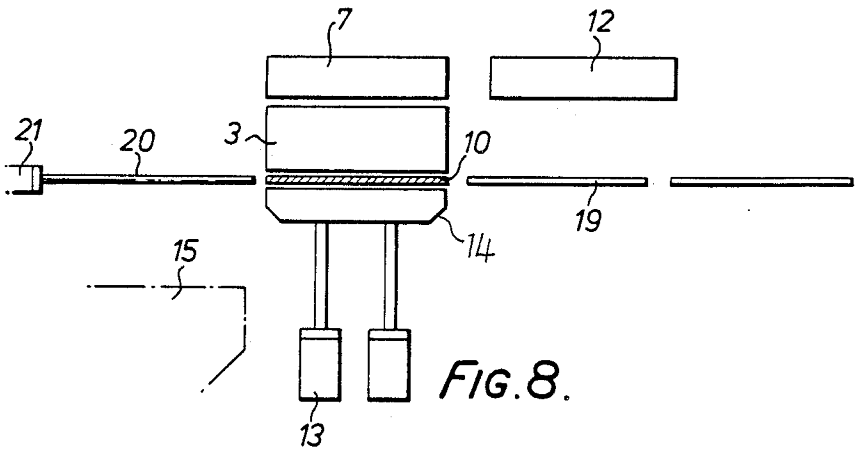
Figure 9:
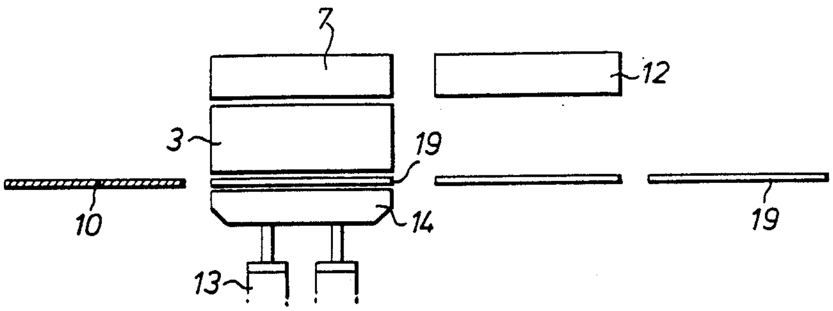
Figure 10:
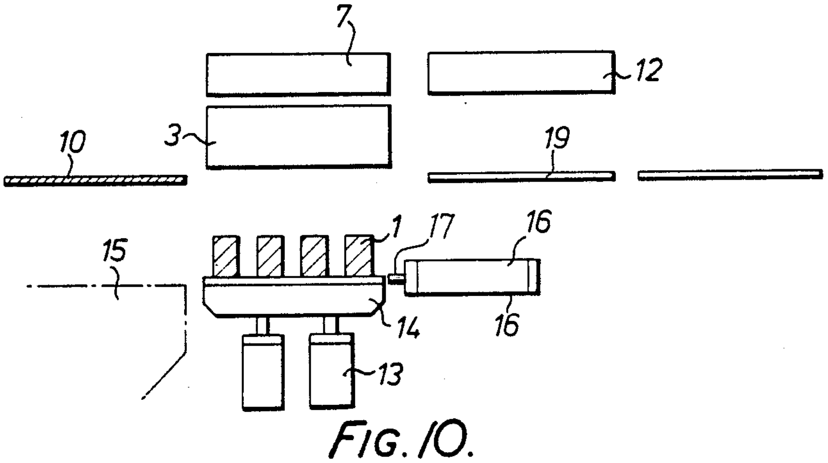

Then the filling wagon 12 is moved back and the stamp 7 is moved downward, as illustrated in FIG. 8. By means (not shown) of suitable vibrating means the stamp 7 and/or the mould 3 and/or the table 14 can then be set into vibration for compressing the moulding mass in the moulding rooms 4. After the moulding mass in the moulding rooms 4 has been sufficiently compressed, the conveyor 18 is put into operation for displacing the product plates 19 in the direction according to arrow A. As is illustrated in FIG. 9, one of the product plates 19 is moved under the mould 3 as a result of that, whilst simultaneously the moulding plate 10 is pushed back to the original retracted position illustrated in FIG. 6.

Next the table 14 with the relevant product plate 19 resting on the table 14 is moved downward, whilst simultaneously the stones 1 shaped in the mould 3 are pressed downward by means of the stamp heads 8. It is noted that, the construction is such that after compression of the moulding mass in the moulding rooms 4, the stamp heads 8 can still be moved downward through the moulding rooms 4 to near the bottom of the mould 3 for effecting an even removal of the shaped stones 1 from the moulding rooms 4 while moving downward the product plate 19 supported by the table 14.

Figure 11:
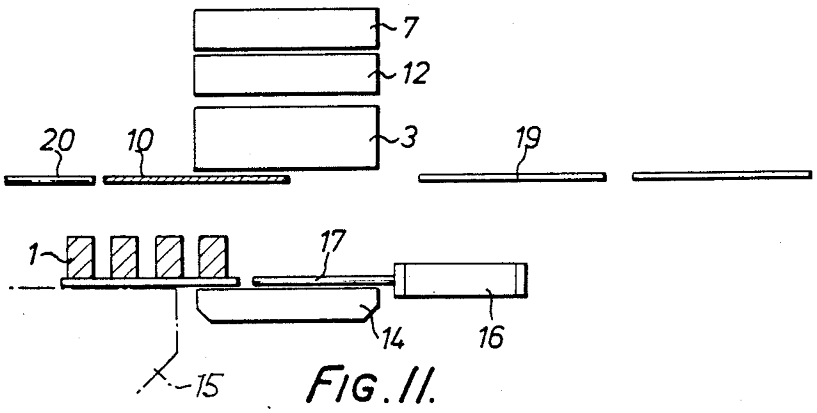

The stones 1 pushed out of the mould 3, standing on the product plate 19, are further moved downward until the table 14 has again arrived at the discharge device 15. Then the product plate 19 can be pushed on the discharge device 15 by means of the pushing means 17, as illustrated in FIG. 11. Then the table 14 can be moved upward again, and the production cycle described hereinabove can be repeated.

It will be apparent that in this way stones 1, vertically standing with their longitudinal axis if desired, can be produced whilst the stones 1 are provided with bevelled edges 2 or chamfers at one or two facing sides, whenever the actual production of the stones 1 takes place on a specially formed moulding plate 10 provided with upright ribs 11, whilst the discharge of the stones 1 takes place on considerably cheaper smooth so-called product plates 19.

Figure 12:
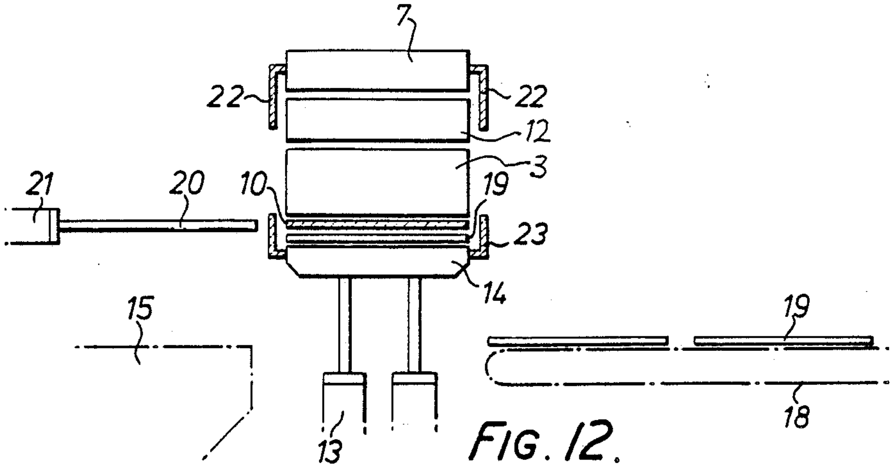
FIGS. 12–14 illustrate a second embodiment of a press according to the invention, whereby the parts of the press are illustrated in consecutive stages of a method for manufacturing stones, whilst
Figure 13:
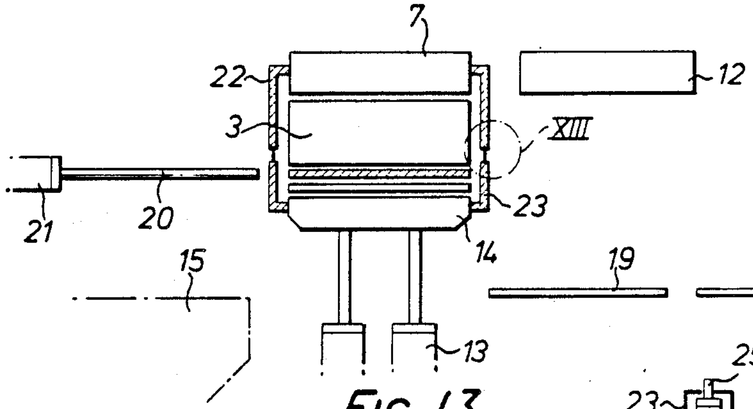
Figure 14:
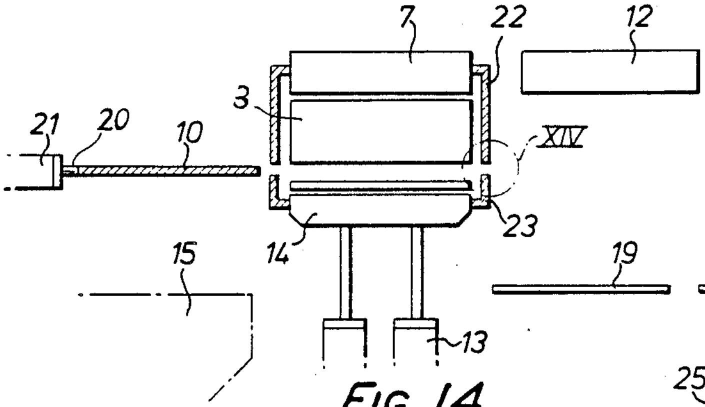

A second possibility for producing the stones by means of the parts illustrated in FIGS. 1–5 is illustrated in FIGS. 12–14. The parts which correspond with the parts described hereinabove are provided with the same reference numbers in these figures as used hereinabove.

In this embodiment, the conveyor 18 (only illustrated in FIG. 12) for supplying the product plates 19 lies on the same level as the discharge device 15.

Figure 13A:
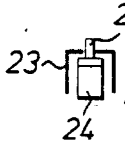
FIGS. 13A and 14A illustrate on a larger scale the parts XIII—XIV encircled in FIGS. 13 and 14.
Figure 14A:
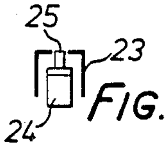

With the device illustrated in the FIGS.12–14, the stamp 7 is furthermore provided with spacing means 22 provided at the sides of the stamp 7 and extending downward, which are intended to cooperate with spacing means 23 fixed to the table 14. As is diagrammatically illustrated in FIGS. 13A and 14A, an adjusting cylinder 24 is incorporated in the spacing means at the upper end of each spacing means 23 by means of which a pin 25 is movable up and down between the position illustrated in FIG. 13A, in which the pin 25 protrudes a little from the upper end of the spacing means 23, nd the position illustrated in FIG. 14A, in which the upper end of the pin 25 is located in the same plane or lower than the upper end of the spacing means 23.

As illustrated in FIG. 12, one product plate 19 rests on the upper surface of the table 14 during filling of the mould 3 by means of the filling wagon 12, whilst the moulding plate 10 rests on the product plate 19.

After the filling wagon 12 has moved away, the stamp 7 is moved downward and the moulding mass is vibrated as described hereinabove. During the vibration, the pins 25 assume their extended position illustrated in FIG. 13A and, at the moment when the spacing means 22, during the downward movement of the stamp 7 during vibration of the moulding mass, get into touch with the ends of the pins 25, a signal is given as a result of which vibrating is stopped. The stones 1 shaped in the mould 3 then have exactly the desired height. After this, the moulding plate 10 is removed from under the mould 3 by means of the pushing means 20, which for this purpose may be provided with a suitable gripping means for gripping the moulding plate 10. Furthermore, the protruding pins 25 are retracted, and the product plate 19 lying on the table 14 is moved upward by means of the table 14 against the bottom of the mould 3, whereby the ends of the spacing means 22 and 23 will again bear against each other, as the stroke along which the pins 25 are retracted is equal to the thickness of the moulding plate 10.

Next the stamp 7 and the table 14 are moved downward simultaneously for pressing the products shaped in the mould 3 out of the mould 3. The spacing means 22 and 23 make sure thereby that the distance between the bottoms of the stamp heads 8 of the stamp 7 and the upper surface of the product plate 19 remains constantly equal during the pressing of the stones out of the mould 3 so that the adjusted length of the stones 1 is maintained and the stones are not deformed in an undesirable manner. After the stones have been pressed out of the mould 3 the table 14 can be moved further downward to the level of the discharge device 15. When the table 14 has arrived at that level, an empty product plate 19 can be moved on the table 14 by putting the conveyor 18 into operation while simultaneously moving the product plate 19 supporting the shaped stones 1 off the table 14, which latter product plate is moved on the discharge device 15. Meanwhile, the stamp 7 may have been moved upward to enable the filling wagon 12 to move above the mould 3 again.

After removal of the product plate 19 supporting the shaped stones 1, the table 14 then supporting an empty plate 19 can be moved upward again to the position illustrated in FIG. 12, in which position the moulding plate 10 can again be moved on the product plate 19, and the cycle described above can repeat itself.

It will be apparent that, with the press described with reference to the FIGS. 6–11 spacing means 22 and 23 may also be provided with a view to obtaining and maintaining an exact length of the shaped stones 1. Thereby it will not be necessary in the first embodiment to provide the adjusting cylinders 24 with the pins 25 adjustable by means of the adjusting cylinders.

Figure 15:
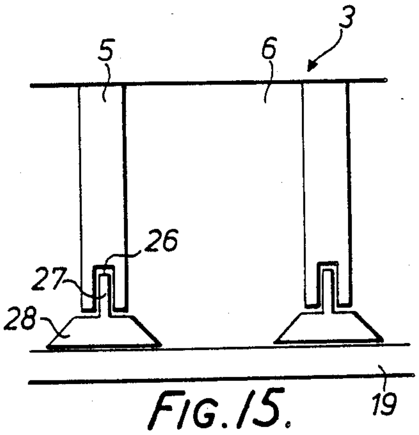
FIG. 15 is a section of a part of a mould, a part of a flat plate placed under the mould, and filling pieces moved between the flat plate and the mould.

FIG. 15 illustrates a section of a mould 3 in which the bottom ends of the longitudinal walls 5 are located a little higher than the bottom edges of the transverse walls 6, whilst grooves 26 have been provided in the bottom ends of the longitudinal walls 5. The grooves 26 serve to accommodate ribs 27, which are fixed to filling pieces 28, which correspond in section with the ribs 11 of a moulding plate 10 described hereinabove. On application of the ribs 28 extending parallel to each other, it will not be necessary to use a moulding plate 10, and the stones 1 can be shaped direct on a product plate 19. Using the filling pieces 28 in a press according to the invention will be more fully explained hereinafter with reference to the FIGS. 16–20. As appears from FIG. 16, the conveyor 18, only illustrated in FIG. 16, again lies on the same level as the discharge device 15. Furthermore the filling pieces 28 extending parallel to each other at the level of the longitudinal walls 5 can here be displaced again by means of the pushing means 20 movable to and fro by means of the adjusting cylinder 21.

Figure 16:
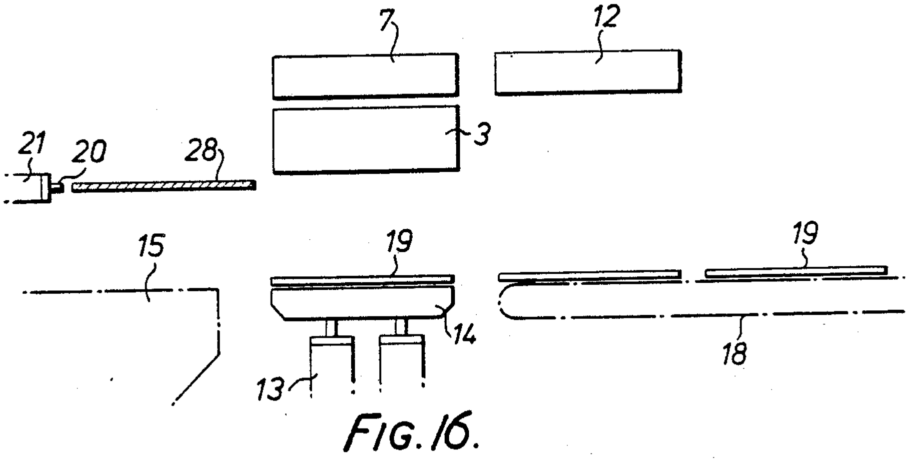
FIGS. 16–20 diagrammatically illustrate a press according to the invention, whereby use is made of the parts illustrated in FIG. 15, whilst in FIGS. 16–20 the various parts of the press are illustrated in positions during consecutive stages of the method according to the invention.
Figure 17:
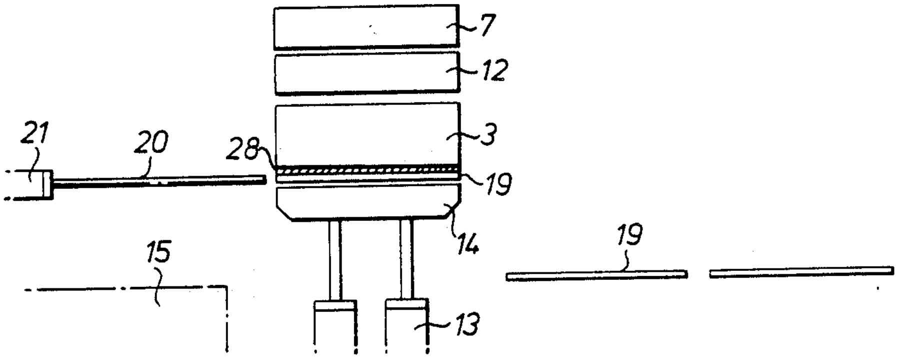

When the table 14, as illustrated in FIG. 16, takes its lowest position, a product plate 19 can be moved on the table 14 by means of the conveyor 18. Next both the table 14 and the stamp 7 can be moved upward to the position illustrated in FIG. 17 in which then, as indicated in FIG. 17, the filling pieces 28 can be moved between the product plate 19 and the mould 3 by means of the pushing means 20, whilst the filling wagon 12 can be moved above the mould 3 for filling the mould.

While the filling pieces 28 are moved under the mould 3, the protruding ribs 27 provide a good guide for the filling pieces 28, so that the filling pieces 28 are put in the correct position relative to the mould 3, whilst the ribs 27 also make sure that the filling pieces 28 do not make undesired movements when the filling mass is being compressed in the mould 3.

After filling the mould 3, the filling wagon 12 can be moved away and the stamp 7 moved downward for compressing the mass put into the mould. The stamp 7 and the table 14 may again be provided with the spacing means described hereinabove, whereby the adjusting cylinders with adjustable pins 25 applied according to FIGS. 12–14 can be left out.

Figure 18:
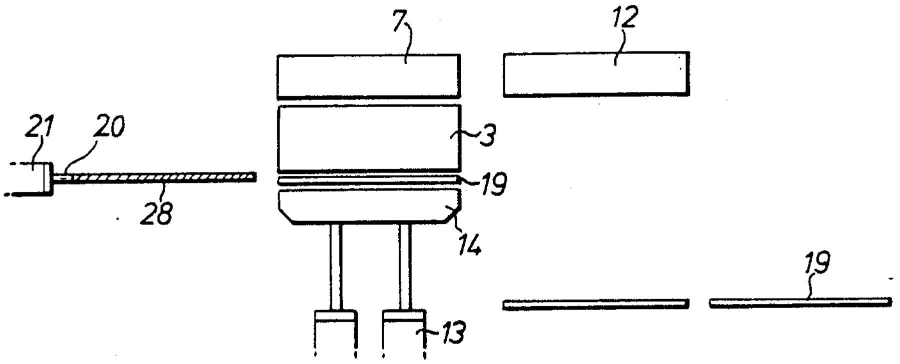
Figure 19:
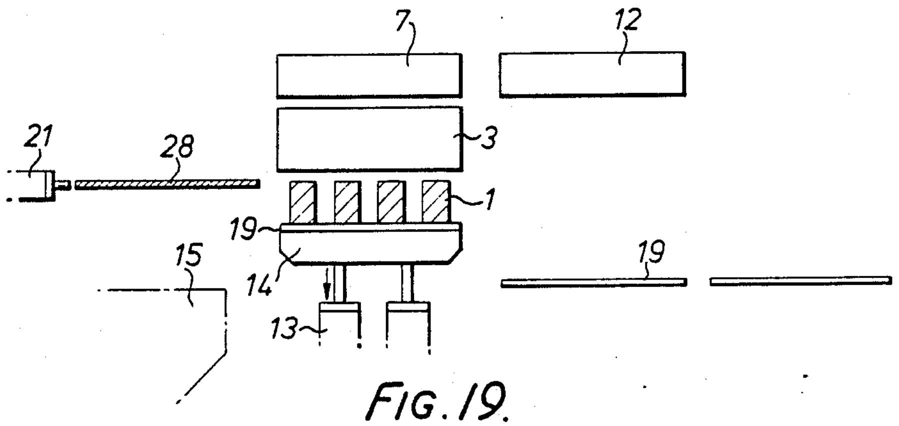
Figure 20:
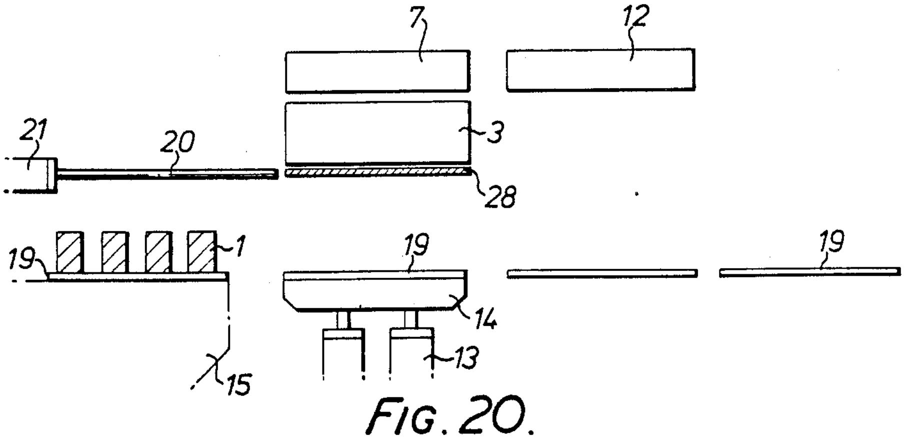

After the moulding mass has been compressed in the desired manner, the filling pieces 28 can be retracted by means of the pushing means 20 as illustrated in FIG. 18, for which purpose the pushing means 20 has been provided with suitable means for taking along the filling pieces 28. After removal of the filling pieces 28, the shaped stones, can be pressed out of the mould by the simultaneously downward movement of the table 14 and the stamp 7 (FIG. 19), after which the table 14 can be moved further downward to the level of the conveyor 18 and the discharge device 15 (FIG. 20). By putting the conveyor 18 into operation again, the product plate filled with stones 1 will be moved from the table 14 on the discharge device 15 by an empty product plate 19. Then the table 14, now supporting an empty product plate 19 again, can be moved upward again, after which the production cycle described above can be repeated.

Figure 21:
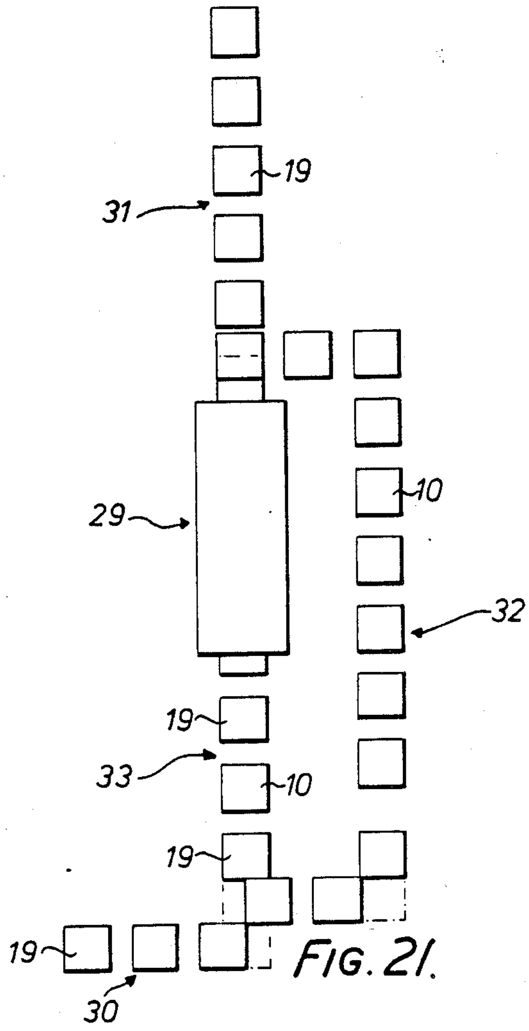
FIG. 21 diagrammatically illustrates a top view of a further embodiment of a press according to the invention.

FIG. 21 diagrammatically illustrates a press 29 which is provided with a stamp, a mould, a filing wagon, a bridge and a discharge means as described hereinabove. Furthermore a supply conveyor 30 has been provided for supplying empty product plate 19, a discharge conveyor 31 for discharging product plates 19 supporting shaped stones 1, and a conveyor 32 by means of which moulding plates 10 leaving the press 29 at the top side seen in FIG. 21 are discharged in the direction of the supply conveyor 30.

The conveyors 30 and 32 join each other near a supply conveyor 33 by means of which a product plate 19 received from the conveyor 30 and a moulding plate 10 received from the conveyor 32 are alternatingly supplied to the press 29.

The use of this device is such that a moulding plate 10 is first placed under the mould incorporated in the press 29, and then the products are manufactured in the mould in the manner described with reference to the FIGS. 6 and 7 directly on the moulding plate.

After the products have been compressed, the moulding plate 10 is further displaced by means of the supply conveyor 33, and the product plate 19 located behind the moulding plate 10 seen in the direction of displacement is moved under the mould. The table 14 is then moved downward, whilst initially the stamp 7 moves along downward too for pressing the shaped products out of the mould. The table 14 with the product plate 19 is moved further downward until the product plate has arrived at the level of the discharge supply conveyor 31, which is located lower than the conveyor 30, conveyor 32, and the supply conveyor 33.

Meanwhile the moulding plate 10 has been brought to the beginning of the conveyor 32 and is delivered to that conveyor to be taken to the beginning of the supply conveyor 33 again by means of the conveyor 32.

It will be apparent, that the manner in which the stones 1 are manufactured by means of this device corresponds in principle with the manner of production as described with reference to the first embodiment however, use is made of a number of moulding plates moving along a closed pass through the device instead of a moulding plate movable to and fro by means of a pushing means.

Of course variations and/or additions to the embodiments described hereinabove and illustrated in the figures will be possible within the spirit and scope of the invention. Thus it will be possible, e.g., to use mechanical means instead of the adjusting cylinders for displacing the various parts. Furthermore it is possible for the various plates to be displaced by pulling means instead of pushing means. The moulding plate 10 may also be mechanically coupled to the relevant pushing or pulling means (e.g., with resilient means such as leaf springs or the like), such that the means effecting the connection between the pushing and pulling means and the moulding plate 10 do not influence the vibrating movement in a disadvantageous manner during vibration of the moulding mass in the mould 3. It is also conceivable to provide the stamp heads 8, besides the two noses illustrated in FIG. 5, with a pair of further noses extending between the ends of the noses 9. Between the ribs 11 corresponding ribs,extending transversely between the ribs 11 near the transverse walls 6 may be provided. With such construction, two facing surfaces of the stone will be provided with circumferential chamfers.

With the press illustrated in FIG. 6 it is also possible to arrange the conveyor 18 at the same level as the discharge device 15. With such a construction, the table 14 will be moved downward after vibration of the moulding mass for bringing a product plate 19 on the table 14 by means of the conveyor 18. Then this product plate is moved upward with the table 14 and, after pulling or pushing of the moulding plate 10, pushed against the bottom of the mould 3. Following that, the shaped stones 1 can be pressed out of the mould 3 and moved downward as described hereinabove. At the level of the discharge device 15 the product plate 19 carrying the stones can then be moved on the discharge device again in the manner described above, after which the table 14 can be moved upward again against the moulding plate 10 under the mould 3 in the meantime.

Figure 22:
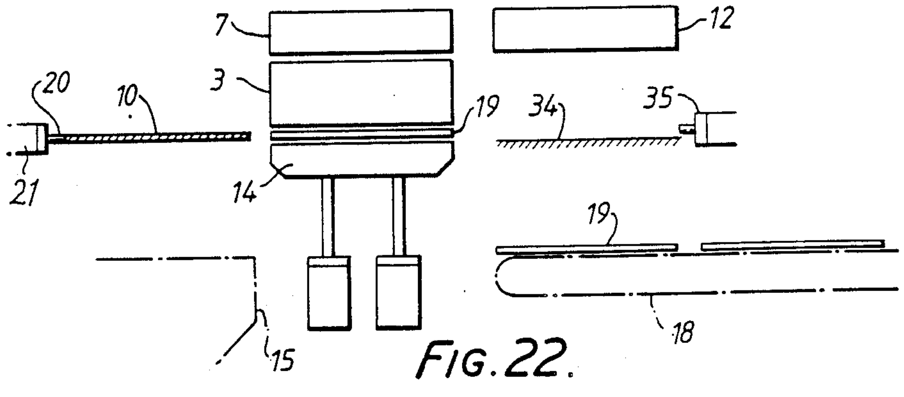
FIG. 22 diagrammatically illustrates a further possible embodiment.

FIG. 22 furthermore illustrates a possible embodiment whereby the device 18 is located at the same level as the discharge conveyor 15. Here, however, a table 34 and a pushing means 35 have been arranged near the pushing means 20, at the side of the mould 3 turned away from the pushing means 20. With this arrangement a product plate 19, supplied by the conveyor 18, can be moved upward by the table 14 to the position illustrated in FIG. 22. In this position the product plate 19 can be moved on the table 34 whilst simultaneously the moulding plate 10 is moved under the mould 3. After the stones 1 have been shaped, the moulding plate 10 may be pulled or pushed from under the mould 3 whilst the product plate 19 is again pushed or pulled under the mould 3 from the table 34. After that the stones 1 may be pressed out of the mould 3 in the manner described above and moved downward together with the product plate 19 by means of the table 14 for discharge.

As an alternative to the construction illustrated with reference to FIGS. 12–14, the construction illustrated in FIG. 23 may be used. With this construction, means have been provided by means of which the product plate 19 can be moved upward over a small distance relative to the table 14.

Figure 23:
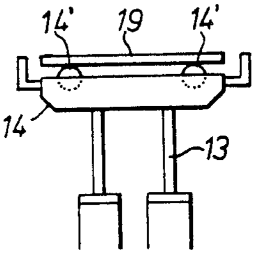
FIG. 23 diagrammatically illustrates a further possible embodiment.

In the illustrated embodiment, those are formed by inflatable balls 14', which have been provided in openings provided in the table 14 and by means of which the product plate can be moved upward over a small distance from a position in which it lies on the table 14 to the position illustrated in FIG. 23.

When using this construction, the product plate 19 supporting the moulding plate 10 located thereabove lies flat on the table 14 when the stones 1 are being shaped. After that the moulding plate 10 is removed as described with reference to FIG. 12–14. Then the product plate 19 is pressed firmly against the bottom of the mould 3 by inflating the bills 14', after which the stones 1, while maintaining the fixed distance between the table 14 and the plate 19 and the stamp 7, with the stamp 7. Then the balls 14' are deflated and the product plate 19 carrying stones 1 is removed, after which a new working cycle can start, all this in a manner similar to the one described with reference to FIGS. 12–14.

We claim:

1. A method of manufacturing stones with beveled edges in a press by arranging longitudinal axes of the stones vertically on a moulding plate comprising providing:

(a) a fixed mould having a plurality of moulding rooms each of which:
   (i) is bounded by upright walls including longitudinal walls and transverse walls;
   (ii) has a top and a bottom;
   (iii) is open at the top and at the bottom; and
   (iv) has two adjacent upright corners formed between the longitudinal walls and the transverse walls that are beveled to form chamfers on longitudinal faces of the stones;

(b) a movable stamp:
   (i) arranged above the fixed mould for movement up and down relative to the fixed mould and
   (ii) having beveled edges for forming chamfers on end faces of the stones;

(c) a movable table arranged beneath the fixed mould for movement up and down relative to the fixed mould;

(d) a conveyor for supplying empty product plates each of which has a flat upper surface to a position beneath the fixed mould; and (e) a discharge for conveying away product plates carrying moulding mass shaped in the fixed mould, the method further comprising the steps of:

(f) closing the bottoms of the moulding rooms by positioning the moulding plate thereagainst, wherein the moulding plate is supported by the movable table and includes an upper surface which is provided with upright ribs for shaping beveled edges on end faces of the stones, and wherein the upright ribs of the moulding plate are positioned to extend at least substantially under the upright longitudinal walls of the moulding rooms when the moulding plate is positioned at the bottoms of the moulding rooms; then (g) filling the moulding rooms in the fixed mould with moulding mass; then (h) moving the movable stamp downwardly to compress the moulding mass in the moulding rooms into a shaped moulding mass until the movable stamp is located at a distance from the movable table determined by corresponding stops provided on the movable table and on the movable stamp, thereby forming stones of constant height within the press, the stones having beveled edges formed on their end faces by the upright ribs extending at least substantially under the upright longitudinal walls of the moulding rooms; then (i) removing the moulding plate from between the movable table and the fixed mould;

(j) simultaneously with step (i), moving the flat product plate into a ready position between the movable table and the fixed mould, in which position the product plate is supported by the movable table; and (k) after steps (i) and (j), ejecting the shaped moulding mass from the moulding rooms onto the product plate by simultaneously moving the movable stamp and the movable table downwardly while maintaining the predetermined distance between the movable table and the movable stamp by means of the stops.

2. A method of manufacturing stones as recited in claim 1 wherein:

(a) the stones are quadrilateral parallelipipeds, each of the stones having a length, a width that is less than the length, a thickness, end faces having a width equal to the width of the stone and a thickness equal to the thickness of the stone, and longitudinal faces having a length equal to the length of the stone and a width equal to the width of the stone;

(b) each of the plurality of moulding rooms is sized and shaped so that, in use, an end face of each stone bears against the moulding plate; and (c) each of the plurality of moulding rooms has surfaces sized, shaped, and positioned for shaping beveled edges on at least one longitudinal face of the stone.

3. A method of manufacturing stones as recited in claim 1 wherein the product plate is pushed off the movable table onto the discharge device after step (k) in an at least substantially horizontal direction.

4. A method of manufacturing stones as recited in claim 1 wherein:

(a) the moulding plate and the product plate are displaced in the same direction during step (j) by a first pushing means and (b), during step (f), the moulding plate is moved in the opposite direction by a second pushing means.

5. A method of manufacturing stones as recited in claim 4 wherein the moulding plate is pushed off the movable table by means of an empty product plate as the empty product plate is delivered into position on the movable table by the conveyor.

6. A method of manufacturing stones with beveled edges in a press by arranging longitudinal axes of the stones vertically on a moulding plate comprising providing:

(a) a fixed mould having a bottom and having a plurality of moulding rooms each of which:

(i) is bounded by upright walls including longitudinal walls and transverse walls;

(ii) has a top and a bottom;

(iii) is open at the top and at the bottom; and (iv) has two adjacent upright corners formed between the longitudinal walls and the transverse walls that are beveled to form chamfers on longitudinal faces of the stones;

(b) a movable stamp:

(i) arranged above the fixed mould for movement up and down relative to the fixed mould and (ii) having beveled edges for forming chamfers on end faces of the stones;

(c) a movable table arranged beneath the fixed mould for movement up and down relative to the fixed mould;

(d) a conveyor for supplying empty product plates each of which has a flat upper surface to a position beneath the fixed mould; and (e) a discharge device for conveying away product plates carrying mould mass shaped in the fixed mould, the method further comprising the steps of:

(f) closing the bottoms of the moulding rooms with a moulding plate by positioning the moulding plate at the bottom of the fixed mould, the moulding plate having an upper surface which is provided with upright ribs for shaping beveled edges on the stones and having a thickness between its upright ribs, wherein the upright ribs of the moulding plate are positioned to extend at least substantially under the walls of the moulding rooms when the moulding plate is positioned at the bottom of the fixed mould; and (g) positioning a flat product plate having a bottom between the moulding plate and the movable table so that the product plate is supported by the movable table; while (h) indirectly supporting the moulding plate with the movable table, which bears directly against the bottom of the product plate; then (i) filling the moulding rooms in the fixed mould with moulding mass; then (j) moving the movable stamp downwardly to compress the moulding mass in the moulding rooms into a shaped moulding mass until the movable stamp is located at a predetermined distance from the movable table determined by corresponding stops provided on the movable table and on the movable stamp, thereby forming stones of constant height within the press, the stones having beveled edges formed on their end faces by the upright ribs extending at least substantially under the upright longitudinal walls of the moulding rooms; then (k) removing the moulding plate from between the fixed mould and the product plate; then (l) moving the product plate upwardly by a distance equal to the thickness of the moulding plate between its upright ribs to thereby bring the product plate into a ready position against the bottom of the fixed mould; then (m) ejecting the shaped moulding mass from the moulding rooms onto the product plate by simultaneously moving the movable stamp and the movable table downwardly while maintaining the predetermined distance between the movable table and the movable stamp by means of the stops; and (n) pushing the product plate from the movable table onto the discharge device.

7. A method of manufacturing stones as recited in claim 6 wherein:

(a) the stones are quadrilateral parallelipipeds, each of the stones having a length, a width that is less than the length, a thickness, end faces having a width equal to the width of the stone and a thickness equal to the thickness of the stone, and longitudinal faces having a length equal to the length of the stone and a width equal to the width of the stone;

(b) each of the plurality of moulding rooms is sized and shaped so that, in use, an end face of each stone bears against the moulding plate; and (c) each of the plurality of moulding rooms has surfaces sized, shaped, and positioned for shaping beveled edges on at least one longitudinal face of the stone.

8. A method of manufacturing stones as recited in claim 6 wherein, after step (k), one of the stops is likewise moved a distance equal to the thickness of the moulding plate between its upright ribs to thereby permit the movable table to move closer to the movable stamp by that distance.

9. A method of manufacturing stones as recited in claim 6 wherein, after step (k(, a first part of the movable table supporting the product plate is moved upwardly relative to a second part of the movable table that carries the stop provided on the movable table until the product plate bears against the bottom of the fixed mould.

10. A method of manufacturing stones as recited in claim 6 wherein the discharge device is vertically movable.

11. A method of manufacturing stones as recited in claim 1 wherein the product plate bearing shaped moulding mass is pushed off the movable table by means of an empty product plate as the empty product plate is delivered into position on the movable table by the conveyor.

12. A method of manufacturing stones at least one of the boundary planes of which have beveled edges by arranging longitudinal axes of the stones vertically on a moulding plate, the method comprising the steps of:

(a) positioning a vertically movable moulding plate beneath a mould having a plurality of moulding rooms each of which:

(i) is defined by dividing walls including longitudinal walls having grooves therein and transverse walls;

(ii) has a top and a bottom;

(iii) is open at the top and at the bottom; and (iv) has two adjacent upright corners formed between the longitudinal walls and the transverse walls that are beveled to form chamfers on longitudinal faces of the stones; then (b) moving a plurality of filling pieces that extend parallel to one another between the dividing walls of the mould and the vertically movable moulding plate, the filling pieces having surfaces for shaping beveled edges on end faces of the stones and protruding ribs that slide into the grooves provided in the longitudinal dividing walls of the moulding rooms when the filling pieces are moved therein; then (c) filling the mould with moulding mass; then (d) compressing the moulding mass in the moulding rooms by means of a movable stamp into shaped stones having beveled edges formed by the filling pieces moved between the longitudinal dividing walls and the moulding plate, the movable stamp:

(i) being arranged above the mould for movement up and down relative to the mould and (ii) having beveled edges for forming chamfers on end faces of the stones; then (e) withdrawing the filling pieces; and then (f) ejecting the shaped stones from the moulding rooms.

13. A method of manufacturing stones as recited in claim 12 wherein:

(a) the stones are quadrilateral parallelipipeds, each of the stones having a length, a width that is less than the length, a thickness, end faces having a width equal to the width of the stone and a thickness equal to the thickness of the stone, and longitudinal faces having a length equal to the length of the stone and a width equal to the width of the stone;

(b) each of the plurality of moulding rooms is sized and shaped so that, in use, and end face of each stone bears against the moulding plate; and (c) each of the plurality of moulding rooms has surfaces sized, shaped, and positioned for shaping beveled edges on at least one longitudinal face of the stone.

14. A method of manufacturing stones as recited in claim 12 wherein, during the step of ejecting the shaped stones, the movable stamp and the vertically movable moulding plate are simultaneously moved downwardly while maintaining a predetermined distance between the table and the movable stamp.

15. A method of manufacturing stones at least one of the boundary planes of which have beveled edges by arranging longitudinal axes of the stones vertically on a moulding plate, the method comprising the steps of:

(a) positioning a vertically movable moulding plate beneath a mould having a bottom and a plurality of moulding rooms each of which:

(i) is defined by dividing walls including longitudinal walls having grooves therein and transverse walls;

(ii) has a top and a bottom; and (iii) is open at the top and at the bottom; then (b) moving a plurality of filling pieces that extend parallel to one another between the longitudinal dividing walls of the mould and the vertically movable moulding plate, the filling pieces having surfaces for shaping beveled edges on end faces of the stones and protruding ribs that slide into the grooves provided in the longitudinal dividing walls of the moulding rooms when the filling pieces are moved therein; then (c) filling the mould with moulding mass; then (d) compressing the moulding mass in the moulding rooms into shaped stones having beveled edges formed by the filling pieces moved between the longitudinal dividing walls and the moulding plate; then (e) withdrawing the filling pieces; and then (f) ejecting the shaped stones from the moulding rooms.

16. A method of manufacturing stones as recited in claim 15 wherein:

(a) the stones are quadrilateral parallelipipeds, each of the stones having a length, a width that is less than the length,a thickness, end faces having a width equal to the width of the stone and a thickness equal to the thickness of the stone, and longitudinal faces having a length equal to the length of the stone and a width equal to the width of the stone;

(b) each of the plurality of moulding rooms is sized and shaped so that, in use, an end face of each stone bears against the moulding plate; and (c) each of the plurality of moulding rooms has surfaces sized, shaped, and positioned for shaping beveled edges on at least one longitudinal face of the stone.

17. A method of manufacturing stones as recited in claim 15 wherein:

(a) the step of ejecting the shaped stones from the moulding rooms is accomplished by moving a stamp downwardly and (b) the stamp and the vertically movable moulding plate are simultaneously moved downwardly while maintaining a predetermined distance between the table and the stamp.

* * * * *

UNITED STATES PATENT AND TRADEMARK OFFICE
CERTIFICATE OF CORRECTION

PATENT NO. : 4,886,633

DATED : Dec. 12, 1989

INVENTOR(S) : Cornelis Rook, et al

It is certified that error appears in the above-identified patent and that said Letters Patent is hereby corrected as shown below:

On the title page, item [73]:

The Assignee is incorrectly recorded "Gebroeders Rock Beheer B.V." should be:

--Gebroeders Rook Beheer B.V.--

Signed and Sealed this

Twenty-fifth Day of December, 1990

*Attest:*

HARRY F. MANBECK, JR.

*Attesting Officer* *Commissioner of Patents and Trademarks*